Figure 1:
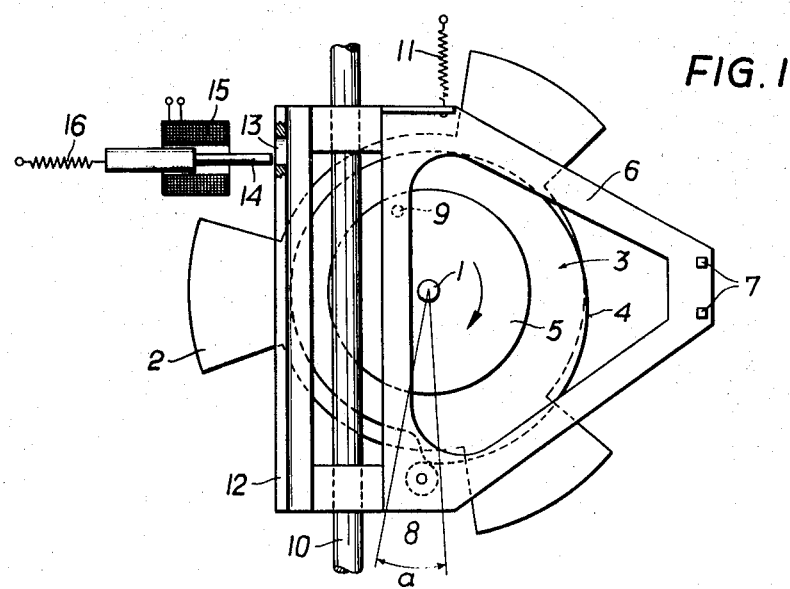

United States Patent

[11] 3,602,411

| [72] | Inventor | Eduard Keznickl |
| | | Vienna, Austria |
| [21] | Appl. No. | 6,450 |
| [22] | Filed | Jan. 28, 1970 |
| [45] | Patented | Aug. 31, 1971 |
| [73] | Assignees | Karl Vockenhuber; |
| | | Raimund Hauser |
| | | Vienna, Austria |
| [32] | Priority | Jan. 30, 1969 |
| [33] | | Austria |
| [31] | | 922/69 |

[54] SHUTTLE MECHANISM FOR CINEMATOGRAPHIC APPARATUS
16 Claims, 2 Drawing Figs.

[52] U.S. Cl. .................................................... 226/67, 352/169
[51] Int. Cl. .................................................... G03 1/22
[50] Field of Search ........................................ 226/59, 66, 67, 68, 72, 73; 352/169

[56] References Cited
UNITED STATES PATENTS

| 2,097,220 | 10/1937 | Blum | 226/66 |
| 2,288,148 | 6/1942 | Sperry | 226/67 |
| 2,420,444 | 5/1947 | Ress | 226/72 |
| 2,497,915 | 2/1950 | Smid | 226/67 |

Primary Examiner—Allen N. Knowles
Attorney—Ernest G. Montague

ABSTRACT: A shuttle cam member is mounted for rotation about an axis. Cam follower means are urged by spring means into engagement with said cam member, which is designed to positively displace said cam follower means to a dead center during a first part of each revolution of said cam member and to permit of a return displacement of said cam follower means by said spring means from said dead center during a second part of each revolution of said cam member. Said cam follower means are adapted to impart to a shuttle member and claw in response to each revolution of said cam member at least one reciprocating movement, at a normal frequency corresponding to a predetermined number of frames per second. Inhibiting means are provided to inhibit said movement of said shuttle member. A detent device comprises a first detent part connected to said shuttle member and a second detent part operatively connected to said inhibiting means. Said first and second detent parts are arranged to be interengaged only during said second part of each revolution of said cam member. Control means are provided for selectively enabling said mechanism to operate at a frequency which is lower than said normal frequency and are movable between operative and inoperative positions and in said operative position are arranged to periodically disengage said first and second detent parts from each other.

PATENTED AUG 31 1971  3,602,411

Inventor:
Eduard Veyrichel
By Ernest J. Montague
Attorney

SHUTTLE MECHANISM FOR CINEMATOGRAPHIC APPARATUS

The invention relates to a shuttle mechanism for cinematographic apparatus, which mechanism comprises a shuttle cam member, which is rotatable on an axis, and a cam follower, which is spring-biased to engage the cam and by which the shuttle claw entering a perforation of the film is moved in the direction of travel of the film and/or relative to the plane of the film, means being provided to inhibit at least one of the movements of the shuttle member and the shuttle member being connected to one detent part of a detent device, which cooperates with t second detent part of the detent device, which second part is operable by the means for inhibiting the shuttle member movement, the cam follower for operating the shuttle or a part which is connected to said cam follower being adapted to be locked only during that part of the revolution of said cam member in which said cam follower is moved by its spring bias, preferably from the dead center between the positive displacement of the cam follower by the cam and the spring-biased return movement of the cam follower.

Various devices are known which serve to effect a still projection and a projection in slow motion. These known devices generally comprise a second cam, which lifts the shuttle member continuously or in rhythmic intervals from the in-out cam. Whereas the shuttle member then performs an advancing motion, it does not engage the perforations of the film. These known arrangements have the disadvantage that the second cam must be most exactly adjusted in relation to the in-out cam at least during assembly to ensure that the shuttle member is lifted from the shuttle cam member only in predetermined positions of the latter. Unless this adjustment is very exact so that the shuttle member is lifted from the in-out cam before the advancing stroke has been completed, the frame adjustment will no longer be correct. Besides, these known devices are relatively complicated and subjected to heavy wear. A device of the kind defined first hereinbefore is also known but in that device the shuttle member movement was inhibited only to enable a phase synchronism to be established between the motor for driving the cam wheel and a scanning beam of a television film scanner without causing a movement of the film. In the design of that known device, a change of the number of frames per second or a prolonged standstill of the film has not been contemplated so that no means are provided for these purposes.

It is an object of the invention to eliminate these disadvantages. The invention resides essentially in that the frequency of the in-out movement of the shuttle is reduced below normal by means of known electric or mechanical control means, preferably an additional cam, which is operable to effect a periodic disengagement of that part of the detent device which is associated with the means for inhibiting the shuttle movement from that part of the detent device which is associated with the shuttle. In a development of the invention, the parts of the detent device can interengage when the shuttle claw is in the position in which it moves through the perforation of the film so that the shuttle member then acts as a locking claw. Alternatively or in addition to the above, that part of the detent device which is associated with the device for inhibiting the shuttle member movement may comprise at least one locking claw. These features ensure a perfect frame adjustment while involving only a very small structural expenditure. In this design, a still projection is enabled without an undue structural expenditure if the cam follower which engages the additional cam is connected by a biasing means, e.g., a spring, to the means for inhibiting the shuttle member movement, and a locking device is movable into the path of the latter means and serves to lock the two parts of the detent device in their interengaged position.

To eliminate the need for an exact adjustment of the means for inhibiting the shuttle member movement relative to the shuttle cam member and yet to ensure that the shuttle member is released from its locked position only when the shuttle cam member is in a predetermined position, the invention teaches to provide a means for locking preferably in a positive manner, the detent device in its interengaged position, and for releasing said detent device from its interengaged position only in predetermined positions of the shuttle cam member.

The means provided according to the invention for inhibiting the shuttle member movement may be driven by various means. It is desirable to provide a known solenoid actuator for the detent device. This has the advantage that the magnetic forces may be relatively small. The locking may suitably be accomplished in that an actuator, such as a return spring or a second solenoid, is provided to release the detent device from its interengagement and this actuator is dimensioned to overcome only in predetermined positions of the shuttle cam member the forces which tend to hold the parts of the detent device interengaged.

Figure 2:
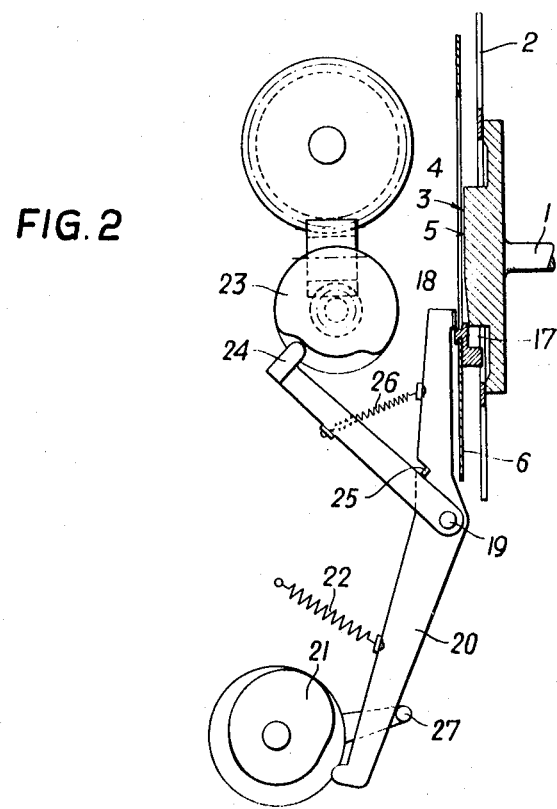

Further features and advantages of the invention will become apparent from the following specification of embodiments shown by way of example in the drawing in which:

FIG. 1 is a front elevation showing a first embodiment; and
FIG. 2 is a side elevation showing a second embodiment.

A shaft 1 carries a three-blade shutter 2 and a shuttle cam member 3, which comprises an advancing cam 4 and an in-out cam 5. The advancing cam 4 is engaged by a follower consisting of a roller 8, which is mounted in a shuttle frame 6. The shuttle frame 6 has shuttle claws 7. The in-out cam 5 is engaged by a follower consisting of a pin 9. The shuttle frame 6 is longitudinally movable along and rotatable about a rod 10. A spring 11 maintains the roller 8 in engagement with the advancing cam 4. The spring which maintains the engagement between the pin 9 and the in-out cam 5 is not shown.

To reduce the shuttle frequency or for a still projection, FIG. 1 shows the shuttle frame 6 to be formed with a flange 12, which is formed with a bore 13, which constitutes one part of a detent device. A detent pin 14 is controlled by a solenoid 15 and cooperates with the bore 13. The pulses for energizing the solenoid 15 are generated in known manner by means which are not shown. The detent pin 14 is under the action of a return spring 16, which tends to return the detent pin 14 to its position of rest.

As has been mentioned, the spring 11 biases the roller 8 to contact the advancing cam 4 during the rotation of the shuttle cam member 4. As a result, the roller 8 is positively displaced by the cam 4 in a region $a$ and is displaced by the spring bias in the other regions. The bore 13 is disposed to be in register with the detent pin 14 only when the roller 8 moving along the cam 4 has reached the dead center between the positive displacement and the displacement by the spring bias. In this position of the roller 8, the cam follower 9 is in that region in which it is positively displaced by the in-out cam 5. For this reason it is not necessary exactly to control the time during which a current pulse is supplied o to the solenoid. If the solenoid 1 is excited before the bore 13 is in register with the detent pin 14, the pin 14 will not engage the bore 13 until it is in its desired position, provided that the pulse is of sufficiently long duration.

On the other hand, when the detent pin 14 has entered the bore 13, a premature fading of the excitation of the solenoid 15 will not be critical because the return spring 16 is so dimensioned that the interengagement between the detent parts is maintained against the force of that spring merely by friction. Only when the roller 8 has reached said dead center at the respective cam is the detent pin 14 sufficiently relieved to permit the spring 16 to overcome the frictional forces, which maintain the detent parts interengaged.

It will be understood that the arrangement and design of the detent device 13, 14 can be varies as desired. An arrangement may be selected which inhibits only the advancing movement or only the in-out movement of the shuttle member. In the embodiment shown by way of example the arrangement is such that the shuttle member is locked by the detent device in that position in which the claw extends through the film perforation so that the shuttle claws 7 act as locking claws. The pin 14 need not be frictionally locked but may be locked by interengagement. For instance, the pin 14 may be replaced by a pawl, which interengages with the flange 12. In that case, the bore 13 must be replaced by a corresponding aperture, which is formed in the flange and through which the pawl can extend in a predetermined position of the shuttle cam member.

In the embodiment shown in FIG. 2, the shuttle frame 6 is formed with a notch 17, which is one part of a detent device. The other part of the detent device is a pawl 18, which consists of a two-armed lever and is pivotally movable about a pin 19. The second arm 20 of the pawl 18 engages with a control cam 21 of a mode selector switch. A spring 22 tends to pull the arm 20 towards the control cam 21. During an operation of the shuttle member at a frequency corresponding to the normal number of frames per second, the control cam 21 tends to move the arm 20 away against the force of the spring 22 so that the pawl 18 cannot engage the notch 17. The drawing shows the position for a lower than normal number of frames per second. For this purpose, another known cam member 23 is provided in addition to the shuttle cam member 3 and is scanned by a cam follower 24. Scanning the cam member 23, the cam follower 24 engages a stop 25 carried by the pawl 18 so that the latter is moved into the path of the notch 17. In this way, the detent device 17, 18 is interengaged in a predetermined position of the shuttle cam member 3 and the shuttle frame 6. This interengagement between the detent parts is eliminated by a spring 26, which extends between the cam follower 24 and the pawl 18 and which is stressed as soon as the cam follower 24 reaches that part of its movement in which it is positively displaced by the cam 23. The spring 26 may be dimensioned so that the interengagement between the detent parts cannot be eliminated unless the shuttle cam member 3 is in a predetermined position.

To enable a still projection, a locking pin 27 is connected to the mode selector switch and is movable into the path of movement of the arm 20 to lock the pawl 18 in its interengaged position. In this case, the movement of the cam 23 causes by means of the cam follower 24 only an alternating stressing and relaxing of the spring 26.

The invention is not restricted to the embodiments shown by way of example but may be applied, e.g., also to lost-motion shuttles.

What is claimed is:

1. A shuttle mechanism for cinematographic apparatus, which comprises
    a shuttle cam member, which is mounted for rotation about an axis,
    cam follower means,
    spring means urging said cam follower means into engagement with said cam member,
    said cam member being designed to positively displace said cam follower means to a dead center during a first part of each revolution of said cam member and to permit of a return displacement of said cam follower means by said spring means from said dead center during a second part of each revolution of said cam member,
    a shuttle member having a claw,
    said cam follower means being adapted to impart to said shuttle member and claw in response to each revolution of said cam member at least one reciprocating movement, at a normal frequency corresponding to a predetermined number of frames per second,
    inhibiting means for inhibiting said movement of said shuttle member,
    a detent device comprising a first detent part connected to said shuttle member and a second detent part operatively connected to said inhibiting means,
    said first and second detent parts being arranged to be interengaged only during said second part of each revolution of said cam member, and
    control means for selectively enabling said mechanism to operate at a frequency which is lower than said normal frequency,
    said control means being movable between operative and inoperative positions and in said operative position being arranged to periodically disengage said first and second detent parts from each other.

2. A shuttle mechanism as set forth in claim 1, in which said first and second detent parts are arranged to be interengaged when and after said cam follower means has reached said dead center.

3. A shuttle mechanism as set forth in claim 1, in which said control means is an electric control means.

4. A shuttle mechanism as set forth in claim 1, in which said control means is a mechanical control means.

5. A shuttle mechanism as set forth in claim 1, in which said control means comprises an additional cam.

6. A shuttle mechanism as set forth in claim 5, which comprises
    a cam follower in engagement with said additional cam
    biasing means connecting said cam follower to said inhibiting means, and
    a locking device, which is movable into the path of said inhibiting means to lock said two detent parts in their interengaged position.

7. A shuttle mechanism as set forth in claim 6, in which said biasing means comprises a spring.

8. A shuttle mechanism as set forth in claim 6, in which
    said control means comprises a mode selector switch,
    said inhibiting means comprises a part which cooperates with said mode selector switch, and
    said locking means comprise a locking pin, which is connected to said mode selector switch and adapted to lock said part of said inhibiting means when said first and second detent parts are interengaged.

9. A shuttle mechanism as set forth in claim 1, in which
    said claw is adapted to assume a position in which it extends through a film perforation and
    said detent parts are arranged to be interengaged when said claw is in said one position so that both said first and second movements of said shuttle are inhibited.

10. A shuttle mechanism as set forth in claim 1, in which said second detent part carries a locking claw.

11. A shuttle mechanism as set forth in claim 1, which comprises a locking device which is adapted to lock said detent device in a position in which said two detent parts interengage and arranged to release said two detent parts for disengagement only in predetermined positions of said shuttle cam member.

12. A shuttle mechanism as set forth in claim 11, in which said locking device is adapted positively to lock said detent device in a position in which said two detent parts are interengaged.

13. A shuttle mechanism as set forth in claim 11, which comprises an actuator which is adapted to release said detent parts for disengagement and which is designed to be unable to overcome the forces tending to maintain said interengagement of said two detent parts unless said shuttle cam member is in predetermined positions.

14. A shuttle mechanism as set forth in claim 13, in which said actuator comprises a return spring.

15. A shuttle mechanism as set forth in claim 13, in which said actuator comprises a second solenoid.

16. A shuttle mechanism as set forth in claim 1, in which said inhibiting means comprise a solenoid operable to drive said detent device.